Sept. 13, 1955  A. W. DE SAULES  2,717,921
TAPE TRANSMITTER

Filed July 31, 1952  2 Sheets-Sheet 1

INVENTOR.
Arthur W. De Saules
BY Norman N. Popper
ATTORNEY

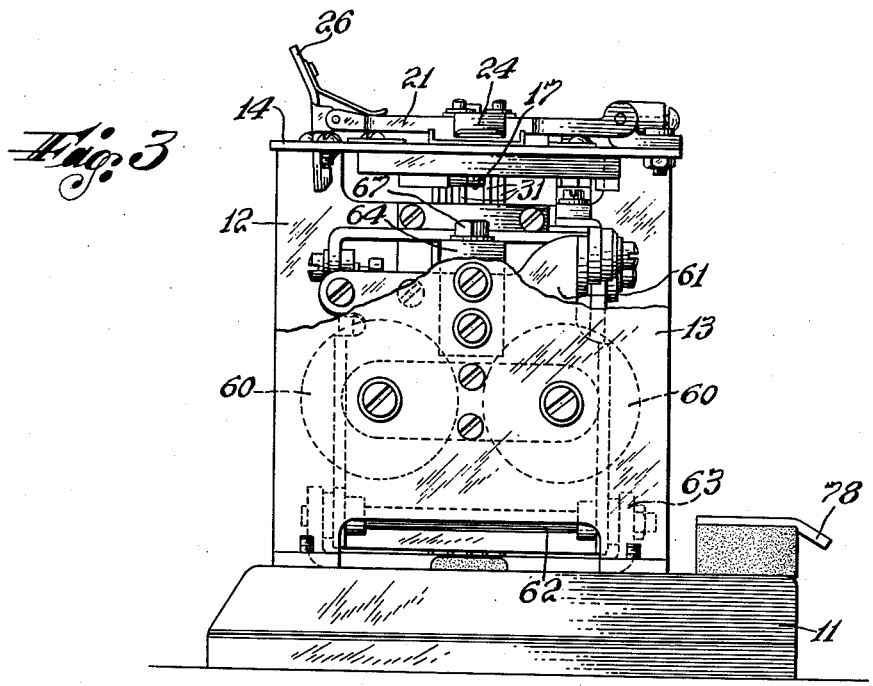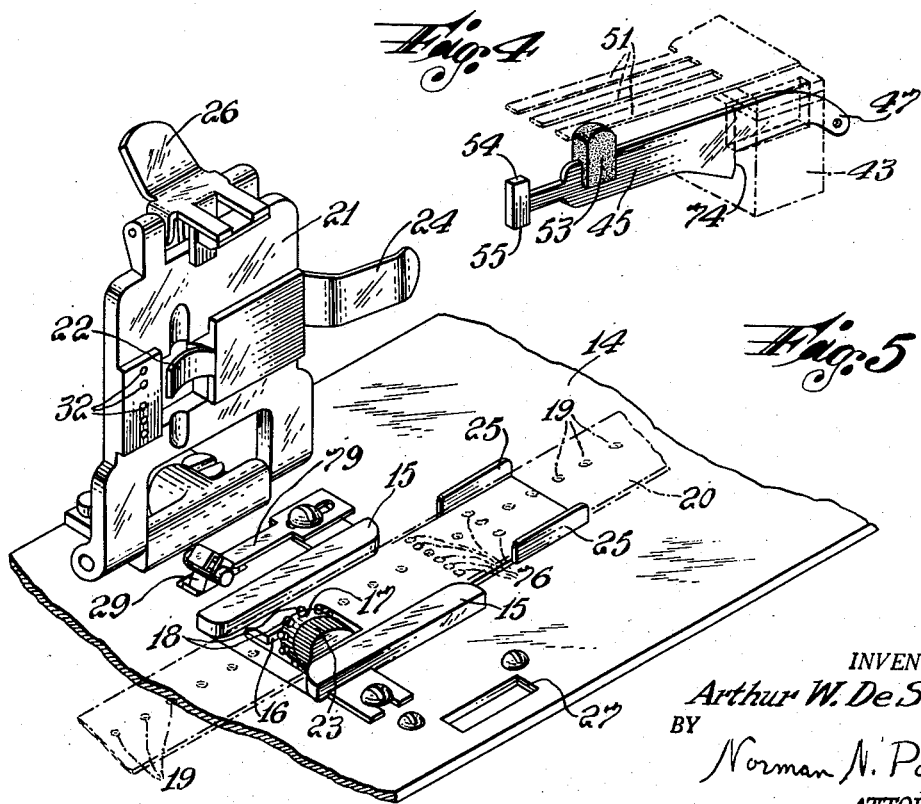

2,717,921

TAPE TRANSMITTER

Arthur W. De Saules, Livingston, N. J.

Application July 31, 1952, Serial No. 302,019

7 Claims. (Cl. 178—17)

My invention relates generally to tape transmitters and specifically to automatic tape transmitters controlled by a perforated tape.

It is among the objects of my invention to provide a tape transmitter in which a tape controls the making and breaking of electrical circuits.

It is a further object of my invention to provide a tape transmitter in which pin sensers act directly upon contact arms and move them to make or break a plurality of electric circuits.

It is yet a further object of my invention to provide a tape transmitter having a contact arm rocking on a cam surface.

A still further object of my invention is to provide a tape transmitter which has an integrated contact assembly which is readily removable for repair.

Yet another object of my invention is to provide a tape transmitter which may be operated at vastly increased rates of speed.

Another object of my invention is to provide a tape transmitter which is relatively inexpensive to produce and service, simple in construction, with a minimum of adjustments, and capable of operation over long periods at high rates of speed without breakdown.

These objects and advantages, as well as other objects and advantages, may be achieved by the device illustrated in the appended drawings in which:

Figure 3 is a rear end view;

Figure 4 is a view of a contact arm; and

Figure 5 is a top view in perspective with the plate raised.

Figure 1:
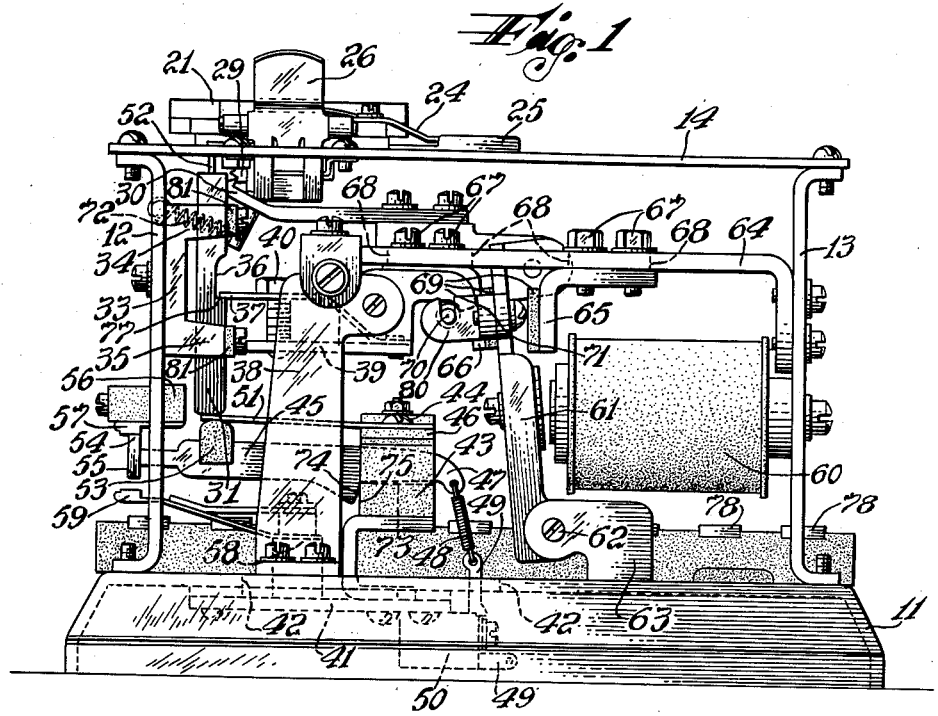
Figure 1 is a side view of my tape transmitter.
Figure 2:
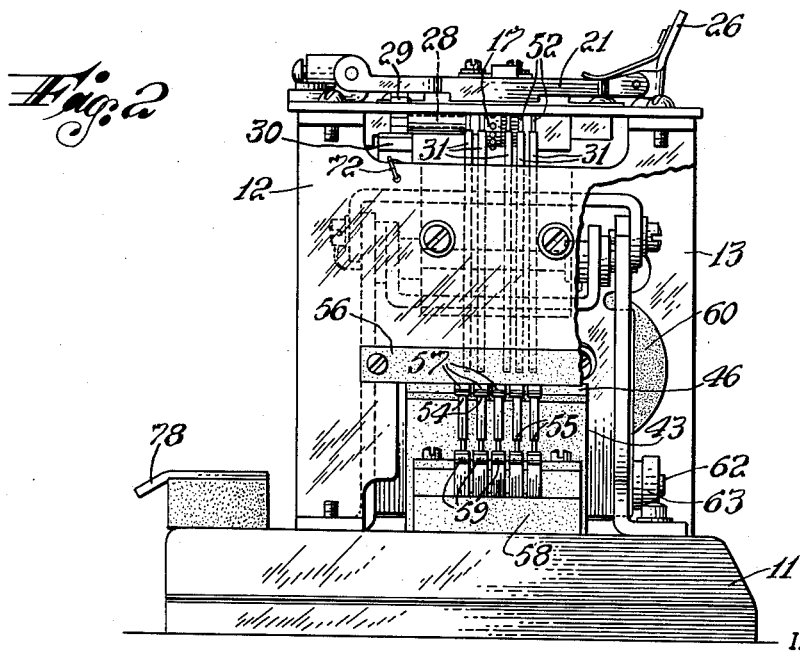
Figure 2 is a front end view.

In my improved tape transmitter, the pin sensers are maintained in normal position by a series of leaf-like fingers or springs each engaging the bottom of a pin senser. The bottom of each pin senser, with the said spring intervening, bears on a pad mounted on a contact arm, so that the motion of the pin sensers is translated directly into the motion of the contact arm. My contact arm is not pivotally mounted but is slidably positioned in a slot in a guide block. My contact arm rocks on a cam surface and is held in normal contact position by a spring. The cam surface also maintains the contact arm in the slot in the guide block against the pull of the spring.

Referring now to the drawings in detail, my tape transmitter has a base 11 with end walls 12, 13 mounted thereon and supporting a top or tape table 14. A tape guide consisting of two raised portions 15 are formed on the tape table 14 immediately adjacent to a feed wheel aperture 16. Extending through this aperture 16, a feed wheel 17 is rotatably mounted under the top 14. This feed wheel 17 is provided with a number of sprockets 18. These sprockets engage holes 19 in a tape 20 and serve to advance it as the wheel 17 turns. A plate 21, is pivotally attached to the tape table 14 at the top thereof and serves to maintain the tape 20 in engagement with the sprocket wheel 17. To his end, the plate is provided with a curved, resilient finger 22 that lightly presses the tape 20 into engagement with a knurled portion 23 of the feed wheel 17 and serves to engage the tape 20 frictionally and advance it with each movement of the feed wheel 17. Another finger 24 maintains the tape between the feed guides 25. A spring pressed latch 26 enters the aperture 27 and keeps the plate 21 down. The feed wheel shaft 28 carries a ratchet wheel 29. A feed pawl 30 rotates this wheel 29. A ratchet wheel detent 79 prevents rotation in the opposite direction. The end of the feed wheel aperture 16 is extended to permit the extrusion of a number of pin sensers 31 and the underside of the plate 21 has a corresponding series of holes 32 to receive the pin sensers 31.

In practice, the tape 20 is provided with a number (not more than five, under some systems) of transverse perforations 76 which correspond to the code signals or characters to be transmitted in the form of electrical impulses. Consequently, there are five pin sensers 31 available to cooperate with the five perforations as they present themselves from time to time on the tape. The present tape transmitter is capable of being integrated into many types of systems by connecting the two series contact members, that will be hereinafter referred to in detail, in a suitable manner. Thus the present tape transmitter can be used merely to make and break a circuit, or can be used for effecting current reversals.

The pin sensers 31 are slidably carried in the pin senser guide block 33. This guide block has two slotted arms 34, 35 upper and lower, into which the pin sensers 31 fit and they are kept therein by retainers 81 fastened to the respective arms 34, 35 by screws, thereby closing the openings in the slots. Each of the pin sensers 31 has a cut-out portion 36 which defines a seat for a retractor 37. The retractor 37 is pivotally mounted on the retractor support 38. The retractor 37 is preferably formed of resilient metal. The retractor has a lower arm 39 which is rigid; a screw 40 passing through the retractor 37 is in threaded engagement with the lower arm 39. By adjusting the screw 40, the retractor 37 may be adjusted in its engagement with the pin sensers 31. The retractor 37 also has an arm 71 extending in the opposite direction to engage with a roller bearing hereinafter referred to.

Attached to the base 11, there is a sub-assembly referred to as the contact assembly. This assembly is mounted on a plate 41 that is secured by screws to the base 11. The assembly extends through an aperture 42 in the base 11. The plate 41 has a contact arm guide 43 formed of insulating material mounted on it by screws 44. This contact arm guide 43 has a series of slots 73 to receive the contact arms 45. A closure plate 46 covers the entrance to the slots and serves to keep the contact arms 45 in the guide slots. Each contact arm 45 has a tail end 47 to which a spring 48 is attached. The springs are secured at their other ends to contact terminals 49 which are mounted on an insulating block 50. The insulating block which mounts the contact arms 45 is attached to the plate 41. On top of the closure plate 46, a five fingered spring 51 is mounted. The ends of the spring 51 normally urge the pin sensers 31 upwardly in which case the pin ends 52 are intruded through holes 19 in the tape 20 that are presented. Immediately below the point where the spring 51 has a finger in contact with the lower end of each of the pin sensers 31, a pad 53 is mounted on each of the contact arms 45. This pad 53 is of insulating material. The end of the contact arms 45 each terminate in an upper contact 54 and a lower contact 55. An insulating bar 56 is mounted on the end wall 12 and carries a series of five top contacts 57, each arranged in corresponding contacting relationship with each of the contacts 54. Another insulating block 58 is mounted on the plate 41 and serves as a mounting for five separate bottom contact members 59 arranged in correspondence with the lower contacts 55.

On the end wall 13, a pair of electro-magnets 60 are mounted. An armature 61 is disposed at the head of the magnets 60, and is pivotally mounted on an axle 62 carried by the armature support 63. The end wall 13 also supports a bridge 64 which carries a stop 65 for restricting the movement of the armature 61 in one direction and another stop 66 for restricting the movement of the armature in the opposite direction. These stops 65, 66 are adjustable as to position by the screws 67 which, in pairs, pass through slots 68 in the bridge. Each of the stops 65, 66 have a pad 69 applied to the face against which the armature 61 may move. This insures quiet operation. The armature carries a roller bearing 70 that engages the retractor rear arm 71. The movement of the armature 61 thereby is transmitted to the retractor 37 causing the pin sensors to be retracted with each attractive response of the armature 61, and released with each corresponding opposite movement of the armature. The spring 51, in urging the pin sensors 31 to normal position likewise acts upon the retractor 37 to restore the armature to the position shown in Figure 1, i. e., in spaced relation to the magnets 60 as when they are not energized. The feed pawl 30 is also pivotally mounted on the armature 61 with a spring 72 maintaining it in engagement with the ratchet wheel 29.

The contact arms 45 pass through slots 73 in the contact arm guide block 43. There is an extended cam surface 74 on each of the arms 45, and it is upon this surface, in contact with the outer face 75 of the guide block 33 that the arms rock back and forth in response to the up and down motion of the pin sensors 31. This motion is imparted to the contact arms 45 through the pad 53 which is mounted on each of the arms 45.

The operation of my tape transmitter is as follows: When the armature 61 is in the position shown in Figure 1, i. e., spaced away from the magnets 60, a series of impulses periodically energizes the magnets 60. Each impulse will draw the armature 61 toward the magnets 60. The pivotally mounted feed pawl 30 on the armature 61 will engage and rotate the ratchet wheel 29. The shaft 28, which carries the wheel 29 does not rotate. The sprocketed feed wheel 17 is formed integrally with the ratchet wheel 29 and they both rotate together in the shaft 28. The tape 20 is thereby advanced to the extent of the rotation of the wheel 17; this distance is calculated to position a series of signal perforations 76 into position for the pin sensors 31. Of course, during the movement of the tape 20, the pin sensors must be retracted or the tape would be torn. This withdrawal of the pin sensors 31 is effected, before the tape moves, by retractor 37. The retractor 37 reacts to the movement of the armature 61 when the end of the retractor arm 71 is raised. The armature 61 carries a roller-bearing 80 which holds the roller 70. The arm 71 rises over when the armature moves. The retractor arm 71 is raised and the retractor 37 pivots downwardly engaging the seat 77 defined by the cut-out portion 36 on the pin sensors 31. A new tape position is now presented with the signal perforations 76 in alignment with the pin sensors 31. When the magnets 60 are deenergized, the armature 61 returns to the position shown in Figure 1 by the combined force of the springs 48, 51, 72. This permits the feed pawl 30, lifted by the spring 72 to return to its original operative position. The retractor 37 pivots upwardly for the tail end 71 is no longer engaged by the roller bearing 70; this releases the pin sensors 31. The springs 48 urge each of the contact arms 45 upwardly. Likewise, the fingers of the spring 51 will urge the pin sensors 31 upwardly, since the retractor 37 no longer holds them down. The pin sensors 31 will rise in the slots in the guide arms 34, 35 until the ends of the pin sensors 31 are either stopped by the tape 20, or extend through a perforation or perforations 76 in the tape. In this manner, the signal perforations 76 in the tape are translated into up and down movements of the pin sensors 31. The up and down movements of the pin sensors 31 are translated into movements of the contact arm 45. When a pin sensor 31 rises through a signal perforation 76 in the tape, then the contact arm 45 pivots on its cam surface 74. The slots 73 in the contact arm block 33 are slightly higher than the contact arms 45 to allow for this rocking or pivoting motion involving the cam surface 74, which also acts as a stop to prevent the springs 48 from pulling the contact arms through the slots. This movement makes or breaks the contact between the upper contact 54 and the top contact 57; and the opposite is correspondingly true; contact is made or broken between the lower contact 55 and the bottom contact 59. Thus the electromotive force presented at contact 57 is translated into a series of impulses at the contact terminals 49. These contact terminals 49 are connected to the contacts 78 which are engaged with other apparatus in the system. The bottom contacts 59 may be similarly connected to the contacts 78 if the nature of the system requires it.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

I claim:

1. A tape transmitter comprising a means for intermittently feeding a tape, a plurality of pin sensors with ends adapted to enter perforations in the tape, spring means normally urging the ends of the pin sensors through the tape, a retractor engaged with the pin sensors, a magnet, an armature cooperatively positioned with reference to the magnet, a roller bearing mounted on the armature and in camming relationship with the retractor whereby the movement of the armature pivots the retractor and withdraws the ends of the pin sensors from the tape.

2. A tape transmitter comprising a means for intermittently feeding a perforated tape, a plurality of pin sensors disposed transversely to the tape, flat leaf springs disposed transversely to the pin sensors and engaged with the bottom end thereof and normally urging the pin sensors to enter a coinciding perforation in the tape, a means for retracting the pin sensors synchronized to retract them when the tape is fed, contact arms disposed transversely to pin sensors, a pad mounted on the contact arm engaged with the flat leaf spring opposite the bottom of the pin senser.

3. A tape transmitter comprising a means for intermittently feeding a perforated tape, a plurality of pin sensors disposed transversely to the tape, flat leaf springs disposed transversely to the pin sensors and engaged with the bottom end thereof and normally urging the pin sensors to enter a coinciding perforation in the tape, a means for retracting the pin sensors synchronized to retract them when the tape is fed, contact arms disposed transversely to pin sensors, a pad mounted on the contact arm engaged with the flat leaf spring opposite the bottom of the pin senser, a guide block having slots therein for vertical movement of the contact arms, the contact arms positioned in the slots for rocking movement in correspondence with the movement of the pin sensors, a spring normally urging the pad on the contact arms into engagement with the flat leaf spring.

4. A tape transmitter comprising a means for intermittently feeding a perforated tape, a plurality of pin sensors disposed transversely to the tape, flat leaf springs disposed transversely to the pin sensors and engaged with the bottom end thereof and normally urging the pin sensors to enter a coinciding perforation in the tape, a means for retracting the pin sensers synchronized to retract them when the tape is fed, contact arms disposed transversely to pin sensers, a pad mounted on the contact arm engaged with the flat leaf spring opposite the bottom of the pin senser, a guide block having slots therein for vertical movement of the contact arms, the contact arms positioned in the slots for rocking movement in correspondence with the movement of the pin sensers, a spring normally urging the pad on the contact arms into engagement with the flat leaf spring, said contact arm having an arcuate extended portion in engagement with the end of the guide block upon which arcuate portion the contact arm will rock.

5. A tape transmitter comprising a means for intermittently feeding a perforated tape, a plurality of pin sensers disposed transversely to the tape, flat leaf springs disposed transversely to the pin sensers and engaged with the bottom end thereof to normally urge the pin sensers to enter a coinciding perforation in the tape, a means for retracting the pin sensers synchronized to retract them when the tape is fed, contact arms disposed transversely to the pin sensers, a pad mounted on the mid-portion of the contact arm and engaged with the flat leaf spring, a contact at one end of the contact arm, said contact arm mounted at the other end for rocking movement, a slotted block for the contact arms, an arcuate portion on each contact arm engaged with the end of the block, springs connected to each of the contact arms and normally urging the pads into engagement with the flat leaf springs and to move in cooperation with the corresponding pin sensers.

6. A tape transmitter comprising a means for intermittently feeding a perforated tape, a plurality of pin sensers disposed transversely to the tape, flat leaf springs disposed perpendicular to the pin sensers and engaged with the bottom end thereof to normally urge the pin sensers to enter a coinciding perforation in the tape, a means for retracting the pin sensers synchronized to retract them when the tape is fed, contact arms disposed transversely to the pin sensers, a pad mounted on the mid-portion of the contact arm and engaged with the flat leaf spring immediately below the end of the pin senser, a contact at one end of the contact arm, said contact arm mounted at the other end for rocking movement, a slotted block receiving each of the contact arms in a slot, an arcuate portion on each contact arm bearing on the end of the block, springs connected to the ends of each of the contact arms and normally urging the arms upwardly and the pads into engagement with the under portion of the flat leaf spring opposite the end of a pin senser, whereby the contact arms move in cooperation with the corresponding pin sensers.

7. A tape transmitter comprising a movable pin senser, a flat spring engaged with the bottom of the pin senser, a contact arm disposed at the bottom of the pin senser and transverse thereto, a pad on the mid-portion of the contact arm in engagement with the flat spring opposite bottom of the pin senser, a slotted member holding the contact arm, an arcuate extended portion on the contact arm engaged with the side of the slotted member whereby the contacted arm may rock back and forth thereon, a contact on one end of the contact arm, a spring attached to the opposite end of the contact arm normally urging the pad into engagement with the flat spring whereby the movements of the pin senser will be translated to movements of the contact arm which will rock back and forth on the arcuate extended portion.

References Cited in the file of this patent
UNITED STATES PATENTS

| | | |
|---|---|---|
| 1,298,440 | Benjamin | Mar. 25, 1919 |
| 1,842,122 | Rothermel | Jan. 19, 1932 |
| 1,863,479 | Hoover et al. | June 14, 1932 |
| 1,912,183 | Dirkes et al. | May 30, 1933 |